(12) United States Patent
Glass

(10) Patent No.: US 6,741,933 B1
(45) Date of Patent: May 25, 2004

(54) TRAVEL TRACKER

(75) Inventor: Paul M. Glass, Sugar Land, TX (US)

(73) Assignee: Advanced Tracking Technologies, Inc., Sugar Land, TX (US)

( * ) Notice: Subject to any disclaimer, the term of this patent is extended or adjusted under 35 U.S.C. 154(b) by 111 days.

(21) Appl. No.: 09/748,886

(22) Filed: Dec. 27, 2000

(51) Int. Cl.$^7$ .................. G01C 21/00; G01S 21/00; G06G 7/78; G08G 1/123
(52) U.S. Cl. .................. 701/213; 701/207; 701/208; 340/990; 340/992; 340/995
(58) Field of Search ................. 701/213, 207, 701/208; 705/13, 19, 31, 417; 702/187, 188, 150; 340/990, 992, 995

(56) References Cited

U.S. PATENT DOCUMENTS

| | | | |
|---|---|---|---|
| 5,432,841 A | 7/1995 | Rimer | 379/59 |
| 5,550,738 A * | 8/1996 | Bailey et al. | 340/459 |
| 5,557,524 A * | 9/1996 | Maki | 340/995 |
| 5,572,528 A | 11/1996 | Shuen | |
| 5,648,904 A * | 7/1997 | Scott | 116/62.3 |
| 5,694,322 A | 12/1997 | Westerlage et al. | |
| 5,719,765 A * | 2/1998 | Book | 324/121 R |
| 5,719,771 A | 2/1998 | Buck et al. | 455/456.5 |
| 5,748,148 A | 5/1998 | Heiser et al. | |
| 5,815,071 A | 9/1998 | Doyle | 340/439 |
| 5,905,461 A | 5/1999 | Neher | |
| 5,987,378 A * | 11/1999 | Schipper et al. | 342/457 |
| 6,072,429 A | 6/2000 | Crothall et al. | |
| 6,087,965 A | 7/2000 | Murphy | |
| 6,088,650 A | 7/2000 | Schipper et al. | |
| 6,138,072 A | 10/2000 | Nagai | |
| 6,141,609 A | 10/2000 | Herdeg et al. | |
| 6,141,610 A | 10/2000 | Rothert et al. | |
| 6,144,916 A | 11/2000 | Wood, Jr. et al. | |
| 6,154,152 A | 11/2000 | Ito | 340/988 |
| 6,195,415 B1 | 2/2001 | Shimoda et al. | 379/22 |
| 6,253,129 B1 * | 6/2001 | Jenkins et al. | 340/438 |
| 6,278,936 B1 | 8/2001 | Jones | 701/201 |
| 6,292,743 B1 | 9/2001 | Pu et al. | 701/202 |
| 6,297,748 B1 * | 10/2001 | Lappenbusch et al. | 340/905 |
| 6,317,686 B1 * | 11/2001 | Ran | 701/117 |
| 6,333,703 B1 | 12/2001 | Alewine et al. | 340/995 |
| 6,353,796 B1 * | 3/2002 | Schipper et al. | 701/207 |
| 6,362,730 B2 | 3/2002 | Ravazi et al. | 340/438 |
| 6,370,449 B1 | 4/2002 | Ravazi et al. | 701/1 |
| 6,430,486 B1 * | 8/2002 | Diaz et al. | 318/587 |
| 6,433,704 B1 * | 8/2002 | Fushiki et al. | 340/539 |
| 6,434,510 B1 * | 8/2002 | Callaghan | 702/116 |

\* cited by examiner

*Primary Examiner*—William A. Cuchlinski, Jr.
*Assistant Examiner*—Brian J Broadhead
(74) *Attorney, Agent, or Firm*—Rick Martin; Patent Law Offices of Rick Martin, P.C.

(57) ABSTRACT

The present invention utilizes integrated software and hardware apparatus to identify, track and report tax-deductible vehicle travel routes including actual mileage, stops and routes driven. Global Positioning Systems (GPS) equipment is used in conjunction with mapping and/or reporting software to display and/or report mileage and vehicle use for tax or reimbursement purposes. Vehicle owners can select mobile units, batch processing, wireless or hard wire mobile unit data downloading.

23 Claims, 17 Drawing Sheets

Daily Travel Report

501 — PaulGlass

Friday October 06, 2000 — 502

Time Interval: 1 Minute(s) — 503

Unknown — 516

Total Tax Deductible Mileage
To /From /Mark-Tax-Deductible : 62.26 — 509, 510

| Start Time (504) | Stop Time (505) | Time Duration (506) | Action Type (507) | Tax Ded. (511) | Location Name (508) | Mileage (509) | Ded. Mileage (510) |
|---|---|---|---|---|---|---|---|
| 11:21AM | 11:21AM | 00:00 | Power | | Power ON | 0.00 | |
| 11:21AM | 11:21AM | 00:00 | Begin | | Begin: U-Unknown | 0.00 | |
| 11:21AM | 11:21AM | 00:00 | In Transit | | In-Transit | 0.23 | |
| 11:21AM | 11:29AM | 00:08 | Stop | | L-Whataburger at 59 | 0.00 | |
| 11:30AM | 11:31AM | 00:01 | In Transit | | In-Transit | 13.50 | |
| 11:31AM | 11:31AM | 00:00 | Power | | Power OFF | 0.00 | |
| 11:31AM | 5:15PM | 05:44 | Stop | Y | L-Home Office | 0.00 | 13.50 |
| 5:15PM | 5:15PM | 00:00 | Power | | Power ON | 0.00 | |
| 5:15PM | 5:19PM | 00:04 | In Transit | | In-Transit | 2.81 | |
| 5:19PM | 5:20PM | 00:01 | Stop | | US HWY 90A | 0.00 | 2.81 |
| 5:20PM | 5:24PM | 00:04 | In Transit | | In-Transit | 2.25 | |
| 5:24PM | 5:26PM | 00:02 | Stop | | DAIRY ASHFORD RD/STATE SPUR 41 | 0.00 | |
| 5:26PM | 5:42PM | 00:16 | In Transit | | In-Transit | 17.42 | |
| 5:42PM | 6:42PM | 00:60 | Stop | Y | L-Restaraunt | 0.00 | 17.42 |
| 6:42PM | 6:43PM | 00:01 | In Transit | | In-Transit | 0.57 | |
| 6:43PM | 11:05PM | 04:22 | Stop | Y | L-Houston Astodome | 0.00 | 0.57 |
| 11:06PM | 11:34PM | 00:28 | In Transit | | In-Transit | 27.96 | |
| 11:34PM | 11:34PM | ---- | End | | End: 22 - 49 HARBOR VIEW DR | 0.00 | 27.96 |
| 11:34PM | 11:34PM | 00:00 | Power | | Power OFF | 0.00 | |

514 — Tax Deductible Mileage: 62.26
515 — Non Tax Deductible Mileage: 2.48

Memo: — 512
This is where a memo would be entered.

Daily Totals: — 513

| # of Stops : | 6 | # of Transit Routes : | 7 | Total Mileage : | 64.74 |
|---|---|---|---|---|---|
| Time at Stops : | 11:17 | Time in Transit : | 00:54 | Average Mileage : | 9.25 |
| Average Time : | 01:52 | Average Time : | 00:07 | Total Accrued Time : | 12.54 / 1 |
| % of Total Time : | 92.61% | % of Total Time : | 7.39% | Time Usage Ratio : | 12:11 |

Today's Date: 12/14/00

FIG. 5

Page # 1

Daily Travel Report (f) — 601

_Sunday December 17, 2000_ — 605

Unknown — 602

Time Interval: 1 Minute(s)

Total Tax Deductible Mileage
To /From /Between Mark-No-Tax /Mark-Tax-Deductible /Un-Mark Location: 6.71

| Start Time | Stop Time | Time Duration | Action Type | Tax Ded. | Location Name | Mileage | Ded. Mileage |
|---|---|---|---|---|---|---|---|
| 5:40PM | 5:40PM | 00:00 | Power | | Power ON | 0.00 | |
| 5:40PM | 5:40PM | 00:00 | Begin | | Begin: U-Unknown | 0.00 | |
| 5:40PM | 5:41PM | 00:01 | In Transit | | In-Transit | 0.10 | |
| 5:41PM | 5:43PM | 00:02 | Stop | | 4100 - 4299 CUSTER CREEK DR | 0.00 | 0.10 |
| 5:44PM | 5:46PM | 00:02 | In Transit | | In-Transit | 1.09 | |
| 5:46PM | 5:47PM | 00:01 | Stop | | Unknown | 0.00 | 1.09 |
| 5:48PM | 5:50PM | 00:02 | In Transit | | In-Transit | 1.50 | |
| 5:50PM | 5:51PM | 00:01 | Stop | | Unknown | 0.00 | 1.50 |
| 5:51PM | 5:52PM | 00:01 | In Transit | | In-Transit | 0.65 | |
| 5:52PM | 5:53PM | 00:01 | Stop | Y | L-post office | 0.00 | 0.65 |
| 5:53PM | 5:53PM | 00:00 | Power | | Power OFF | 0.00 | |
| 5:53PM | 5:53PM | 00:00 | In Transit | | In-Transit | 0.12 | |
| 5:53PM | 6:50PM | 00:57 | Stop | Y | L-Randles | 0.00 | 0.12 |
| 6:50PM | 6:50PM | 00:00 | Power | | Power ON | 0.00 | |
| 6:50PM | 6:50PM | 00:00 | In Transit | | In-Transit | 0.10 | |
| 6:50PM | 6:51PM | 00:01 | Stop | | 2500 - 2533 WILLIAMS TRACE BLVD/SWEETWAT | 0.00 | 0.10 |
| 6:52PM | 6:58PM | 00:06 | In Transit | | In-Transit | 3.15 | |
| 6:58PM | 6:58PM | ---- | End | | End: L-mail box | 0.00 | 3.15 |
| 6:58PM | 6:58PM | 00:00 | Power | | Power OFF | 0.00 | |

603 — Tax Deductible Mileage: 6.71
604 — Non Tax Deductible Mileage: 0.00

Daily Totals:

606

| # of Stops : | 6 | # of Transit Routes : | 7 | Total Mileage : | 6.70 |
|---|---|---|---|---|---|
| Time at Stops : | 01:03 | Time in Transit : | 00:12 | Average Mileage : | 0.96 |
| Average Time : | 00:10 | Average Time : | 00:01 | Total Accrued Time : | 5.25 / 1 |
| % of Total Time : | 84.00% | % of Total Time : | 16.00% | Time Usage Ratio : | 01:15 |

Today's Date: 12/18/2000

FIG. 6C

Page # 1

TRAVEL TRACKER

FIELD OF THE INVENTION

The present invention relates to hardware and software to verify, monitor and document vehicle travel activities for tax deductible or reimbursable mileage.

BACKGROUND OF THE INVENTION

Business operators, law enforcement, private detectives, parents and many other vehicle owners have reason to record the travel history, stop points, time-at-stop, mileage, speed history, and other related activities of individual vehicles. Tax-deductible mileage recorded and reported automatically lends itself to both an accurate and efficient method of verification and record keeping. Computerized data gathering and reporting for a fleet of vehicles would lend itself to time and efficiency savings. For example, a company owned vehicle(s) used by an employee(s) for business and personal use would have some percentage of mileage that is tax deductible. The employee(s) would have to keep detailed records of each activity in order to categorize company versus personal usage. Manual time estimates, error, and trustworthiness can all be issues. The present invention provides a method for vehicle owners to know where their vehicles have been, showing total travel routes, rates of speed, concise mileage reports, stop times to the minute, tax deductible mileage for business use, etc. using today's GPS (Global Positioning System) technology.

The Global Positioning System or "GPS" was developed by the U.S. Department of Defense as a worldwide navigation and positioning resource for both military and civilian use. It is based on a constellation of 24 satellites orbiting the earth over 20,000 km in altitude. These satellites act as reference points from which receivers on the ground "triangulate" their position.

By measuring the travel time of signals transmitted from the satellites, a GPS receiver can determine its distance from each satellite. By having distance measurements from four or more different satellites and some advanced mathematical equations known as a "Kalman filter", the receiver can calculate its latitude, longitude, altitude, speed and course traveled.

To make GPS even more accurate, some additional techniques have been developed. These techniques are known as Differential GPS or "DGPS". This method of DGPS yields position measurements good to a couple of meters.

Differential GPS works by canceling out some of the natural and man-made errors found within normal GPS measurements. These include clock errors within the satellites, and the delays induced by their travel through the earth's atmosphere. These errors are resolved by introducing differential corrections from a ground based reference station that calculates the corrections needed for the induced errors.

Use of GPS technology is a basis of gathering data for positioning, stops, travel speed, distance between coordinates etc.

The present invention provides integrated software and hardware apparatus to verify approved stops, actual mileage, routes, inventory usage, speed of vehicle recording, and other informational data. The software can be provided for local or wide area networking using client and server computer platforms.

In order to best view the advantages of the present invention a summary of the most relevant prior art follows below.

SUMMARY OF THE PRIOR ART

U.S. Pat. No. 6,141,610 (2000) to Rothert, et al. discloses a vehicle operation method and apparatus for monitoring usage and condition of a vehicle including mileage, gas used, collision damage, area of operation, time of usage.

U.S. Pat. No. 6,141,609 (2000) to Herdeg, et al. discloses a method of collecting a vehicle itinerary determining the length of travel, time of travel, and the routing as in a trip journal and determining who drove the vehicle.

U.S. Pat. No. 5,572,528 (1996) to Shuen discloses a method to provide continuous, transparent communication between a mobile node and primary, secondary or tertiary networks.

U.S. Pat. No. 5,694,322 (1997) to Westerlage, et al. discloses a method for determining tax of a vehicle. It includes a positioning device operable to determine a plurality of vehicle positions along a route traveled by the vehicle. A memory stores geographic information defining a plurality of taxing regions through which the route of the vehicle passes. The object being to determine the tax for the vehicle in at least one taxing region through which the route of the vehicle passes.

U.S. Pat. No. 5,748,148 (1998) to Heiser, et al. discloses a positional information storage and retrieval system and method. It consists of a plurality of receiver/transmitter units and a processor unit. Coordinate information of receiver/transmitter units is received by the positional information unit and used to determining the positional information according to triangulation or other techniques embodied within the positional detection unit. Algorithms embodied within the processor unit generate, update and control access to a database of information relating to locations of the subjects within the operational environment over time.

U.S. Pat. No. 5,905,461 (1999) to Neher discloses a method utilizing a global positioning and tracking system for locating one of a person and item of property.

U.S. Pat. No. 6,144,916 (2000) to Wood, Jr., et al. discloses a method and apparatus for a base station or interrogator station to monitor the itinerary of one or more vehicles or other movable assets.

U.S. Pat. No. 6,138,072 (2000) to Nagai discloses a navigation device for use in a vehicle which is capable of determining and displaying a current position of the vehicle on a road map indicated on a display screen via Internet communication means.

U.S. Pat. No. 6,072,429 (2000) to Crothall, et al. discloses an integrated position determination system and radio transceiver.

U.S. Pat. No. 6,088,650 (2000) to Schipper, et al. discloses a vehicle location system for monitoring location, speed, and odometer of a vehicle.

U.S. Pat. No. 6,087,965 (2000) to Murphy discloses a calibration means for a vehicle mileage meter or taximeter.

What is needed is a method to integrate collected vehicle mileage, speed, stop, route and time information with software and networking that provides detailed documentation on all vehicle activities including use for tax deductible mileage and/or for reimbursement for vehicle use.

The present invention meets these needs and can provide a color-coded speed history map and driver data entry records for inventory control.

SUMMARY OF THE INVENTION

The main aspect of the present invention is to provide integrated software and apparatus for the collection and reporting of data concerning mileage and vehicle use for tax purposes.

Another aspect of the present invention is to verify and document actual mileage, stops, and/or routes driven for use as documentation for tax-deductible mileage and/or for reimbursement of vehicle use.

Another aspect of the present invention is to provide mobile units with a processor, storage, wireless modem, serial communications, GPS connectivity, remote data entry, and software to allow wireless and direct PC connectivity to base units. Such mobile units have unique identifiers.

Another aspect of the present invention is to provide colorized mapping data to show routes taken, speed indicia while in route and stops in route.

Another aspect of the present invention is to provide reports for tax and information purposes to show vehicle activity such as stops, stop times, routes, speeds, taxable mileage, miscellaneous mileage, etc., and be able to construct such reports in a variety of ways (by driver, by vehicle, by group, by date, etc.).

Another aspect of the present invention is to provide less expensive mobile units to communicate and store data via GPS and to connect directly to a base unit or PC for data transfer.

Other aspects of this invention will appear from the following description and appended claims, reference being made to the accompanying drawings forming a part of this specification wherein like reference characters designate corresponding parts in the several views.

Hardware setups will generally include one computer to act as a base unit and to interface directly with mobile units in collection of data.

A. The Base Unit

A base unit is where all remote/local data downloads occur. A base unit receives data packets from mobile unit(s) either through wireless or direct communications. Base units contain working software for updating database, reporting, viewing tracks, customizing reporting formats etc.

The base unit software also performs functions such as:
Administrative user security setting, maintenance, etc.
Extracting packet files from mobile units
Formatting incoming data files prior to processing
Processing incoming GPS packet data from mobile unit files into a common database
Mobile unit profiles associated with that unit B. The Mobile Unit Mobile units all contain firmware with software to gather GPS data, store data and download into application software that provides detailed distance, location (longitude/latitude), time, speed, and heading information necessary to monitor the units and drivers. Information is collected in specific time intervals such as once every 10 seconds during the vehicles movement. Units can usually be mounted anywhere inside a vehicle except in direct sunlight. The antenna can be mounted such that it can receive satellite signals. Powering the mobile unit off for more than 16 hours may require up to 10 minutes when re-powered on to acquire a new and adequate GPS signal. If the unit(s) is left stationary for long periods of time there is a slight chance that data downloaded may appear as if the unit has wandered off for short distances.

This may be due to the DOD's procedure for selective availability or atmospheric conditions creating signal disturbances. Website www./aafb.af.mil/SMC/CZ/homepage will list dates and times of possible problems.

Mobile units can be configured in a variety of ways. Increased memory storage, motion detection without starting, more efficient current draw, direct PC connectivity vs. local vs. remote wireless connection, remote data entry are some examples that relate to the mobile unit configuration and cost.

Mobile units can be permanently wired into a vehicle in the case of wireless transmission capability. Other units would provide a means to interface through standard 9-pin serial port connectors.

The data collection rate of a mobile unit is the time interval in which the unit will collect and log a GPS coordinate, time and speed. Non-wireless units can be set for a variety of settings with a default of 10 seconds. For example, they may be set at 3, 7, 10, 15, 20, 30, 45, 60, 90, 120 seconds depending on end user activity requirements etc.

In the simplest of systems, a mobile unit can collect data and be brought to a base unit (home PC) for collection and reporting of data directly. Download to the base unit can be accomplished by direct hard wire connection or by local wireless connection (infrared for example) or via a wireless radio transceiver. The base unit will contain the software to generate reports directly to the end user.

In a higher cost configuration, a mobile unit may have increased memory, real time remote monitor/tracking, wireless download of packet data to a base unit, built in motion detector, differential GPS readiness, switched power capabilities (only on if vehicle is running for example). Other functions can include different GPS antennas (amplified and passive), permanent vehicle mount, driver data input etc. Driver input may consist of inventory used, product delivered, job costing, order administration, payroll, billing among other functions.

The downloaded data from the mobile unit(s) is stored in the base computer to be accessed by the user for mapping the routes driven or to produce reports of stops, times and mileage's driven. Through the mapping software the user marks or identifies a tax-deductible location based either on an actual stop made or a physical location on a map by street address. Once the tax deductible location is identified, the user is allowed to choose if the mileage to or from that stop location from the last or next stop is to be considered tax deductible. The user is also allowed to include mileage between two tax-deductible locations as being tax deductible. Once the parameters are set, the software will automatically tabulate the tax deductible and non-deductible mileages and display the information on a grid style form. The user is then allowed to review which mileage they would like to add or subtract for additional stops for mileage to be included or not to be included in the final report. The user cannot change the total mileage for the day as calculated by the GPS route but only the proportion of deductible versus non-deductible mileage.

C. Administrative Tasks

1. Base Unit related tasks

Typical administrative tasks in setting up and maintaining a base unit may include but not be limited to:
Initial installation of base unit software
Setting up the administrator name/password for security reasons
Adding/deleting all user licenses
Periodically reviewing all user licenses
Adding/Deleting custom user groups
Adding/Deleting/Modifying user name(s) to group(s)
Setting user/group security rights such as common locations, branch information, inventory system, time tracking, vehicle issue, etc.

Modifying user name(s), other user information

Viewing all user/group names/information

2. Client related tasks

Typical administrative tasks in setting up and maintaining a client would include but not be limited to:

- Installation of software
- Setting administrative name/password
- Add data regarding company and related entities
- Logging onto a viewport screen to monitor tracking data, run report(s), build database files, etc.
- Clearing a locked user. For example, regaining user access for a user that exited from the system without first logging out
- Purging unused or old GPS data from the database
- Compacting and repairing database after each purge to optimize disk space utilization
- Backup of the database periodically to a backup directory or setting of automatic backup frequencies.
- Handling download errors. For example, before records are added to the database they must be associated with a valid unit and current vehicle. If they do not qualify, they are handled as a download error.
- Reviewing data map data to insure certain street level data is available for viewing. Downloading map data as required from the server.

3. Mobile Unit related tasks

Setting up individual tracking units would typically include but not be limited to:

- Initially connecting mobile unit to an open computer port to establish initial communication validation.
- Input validation code for each respective mobile unit. This would allow software to verify validity of unit and add unit to database.
- Installation of the mobile unit into the respective vehicle Once all mobile tracking units have been validated, the system is ready to start the GPS data collection process.

D. End User Reports

Many reports are made available to the end user. The analysis reports present GPS tracking data in a unique structure that is designed to present a certain effective viewpoint of tracking activity. Each duration of time identified as a stop is cross-referenced with the marked coordinates of the informational data such as common location, employee house, customer location, etc. A coordinate is considered to be a match if it is included within a pre-defined area of the mark (or target area). If the mobile unit is powered OFF, the time interval and the location of that event will be reported. Software is designed to identify stops by two separate means. One such means is a power failure or the mobile unit being powered OFF. The duration of a stop is calculated from the point of the power OFF (or failure) to the time the first coordinate is received from that mobile unit after the power OFF (or failure). Another such means is determined by the variation of two consecutive GPS coordinates. A mobile unit stop duration is then calculated from the first coordinate received that shows no motion until the first consecutive coordinate that shows motion.

The following is an example listing of reports that can be accessed. Reports are not limited to those that follow. Other reports can be added or existing reports can be modified to specific end user requirements. Typical reports are:

Branch Information Listing: A report of selected branches to include name, address, phone numbers, etc.

Common Location Listing: A report of listings of common (fixed) locations. This report includes name, address, phone numbers etc.

Customer Data Sheet: Single customer information such as name, address, phone, contact name etc.

Customer Activity Report: Listing of customer activity records entered by the mobile unit(s) such as Job-In time, Job-Out time, date, etc.

Customer Inventory Transactions Report: Detail of inventory usage for a specific customer(s).

Customer Report: Report of all selected customers on one single sheet.

Employee Data Sheet: Contains all informational data for a single employee such as employee number, accounting system ID, name, address, phone(s), etc.

Employee Roster: Personal data of all selected employees. Uses same database as employee data sheet.

Employee Daily Summary Report: Shows day-to-day mobile and work activity of an employee. Calculates total time, job and mileage.

Employee Inventory Transactions Report: Presents a view of inventory items utilized by employees showing quantity and item of inventory that an employee used on a given date.

Employee Job Activity Report: Displays all Job-in/Job-out entries for selected employee and date range.

Employee Mileage Report: Details odometer entries for each selected employee, associated customer and date along with calculated mileage.

Employee Time Details Report: Sorting of time and job records by employee, separated by customer.

Employee Timesheet: Daily work time spent for one employee including an area for employee to add sign and signature approval.

Employee Time Summary Report: Provides view of employee's time/payroll information with date summaries.

Employee Complete Tracking Report: Shows day-by-day mobile activity of an employee.

Vehicle Complete Tracking Report: Shows day-by-day mobile activity of a mobile unit.

Employee Daily Travel Report: Shows daily in-transit activity for each employee, calculates daily averages and percentages and provides statistical analysis of data accumulated.

Vehicle Daily Travel Report: Shows daily in-transit activity for each mobile unit, calculates daily averages and percentages and provides statistical analysis of data overall.

Employee Stop Report: Provides detail of stop locations and duration for a given route on a specified employee by date and time.

Vehicle Stop Report: Provides details of stops for a given route on a specified mobile unit and can be sorted by employee.

Employee Power Activity Report: Provides detailed listing of where and when a mobile unit is powered on and off by employee.

Vehicle Power Activity Report: Provides detailed listing of where and when a particular mobile unit is powered on and off.

Location Marking Status Report: Indicates whether there are marked locations that have not been assigned coordinates.

Inventory Roster Report: Provides a listing of all inventory items entered into the inventory form.

Inventory Status Roster by Inventory Number Report: Lists all transactions made which involved a selected inventory item(s). Organized first by inventory number, each line specifies the date and time of the transaction as well as involved employee and quantity of item used.

Inventory Status Roster by Item Number Report: Lists all transactions made which involved the selected inventory item.

Inventory Transaction Report by Inventory Number: Provides an itemization of an employee's utilization of inventory stock.

Inventory Transaction Report by Item Number: Provides an itemization of employee's utilization by item number.

Vehicle Activity Report: Provides an itemization of all time, job, and mileage activity as it relates to a specific service mobile unit.

Vehicle Assignment Report: Displays issuing data by mobile unit such as start and end dates and times as well as the employee to whom the vehicle was issued.

Vehicle Information Listing: Displays vehicle specific information of each mobile unit such as VIN number, license plate number, model, year, etc.

BRIEF DESCRIPTION OF THE DRAWINGS

FIG. 5 is an example of an Employee Daily Travel Report.

FIG. 6C is an example of a resultant daily mileage report from action taken on user input screens shown in FIGS. 6A, 6B.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF DRAWINGS

Figure 1:
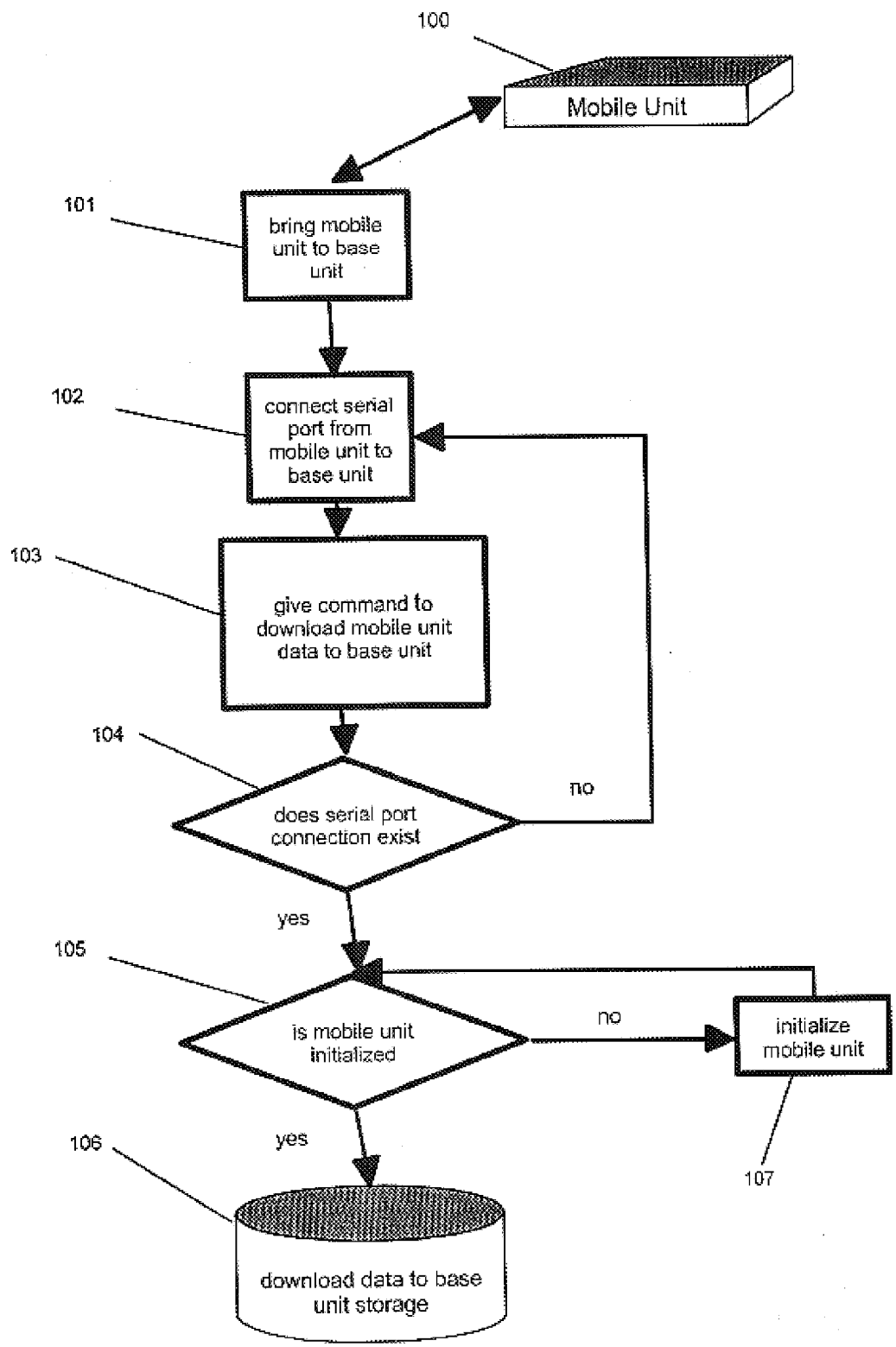
FIG. 1 is a logical flow chart of a mobile unit to base unit connection in downloading data.

Referring first to FIG. 1, a logical flow chart is shown of a process carried out between a mobile unit and a base station to which it is assigned and from which data has to be directly downloaded. That is, downloaded via PC serial cable connection.

Mobile Unit (block 100) is physically brought to the base unit (functional block 101). A direct serial port connection (functional block 102) is made from the mobile unit (block 100) to the base unit (block 101). The end user issues a command to download mobile unit data to the base unit (functional block 103). Software checks to see if a serial port connection exists (block 104). If a serial connection does not exist a message is given to the end user to connect the serial port from the mobile unit to the base unit (return to block 102). If the serial port connection does exist is queries the mobile unit to see if it was initialized (block 105). If the mobile unit has not been initialized the end user receives a message to initialize the mobile unit (functional block 107) and the base unit will again query to see if the mobile unit is initialized (returns to block 105). If the mobile unit is initialized the data from the mobile unit is downloaded and stored (functional block 106) on the base unit.

Figure 1A:
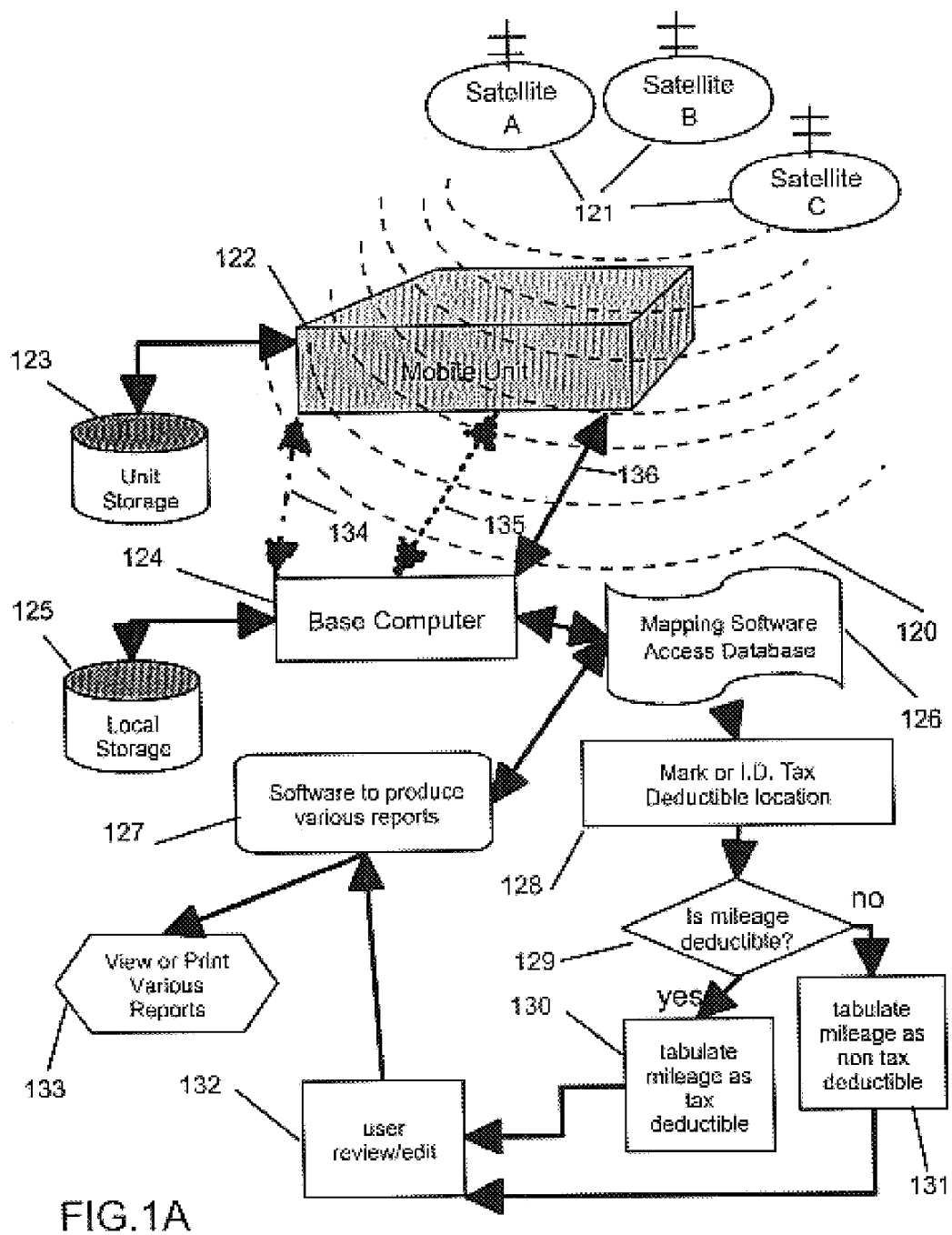
FIG. 1A is a logical flow chart of satellite to mobile unit to data flow including the tax-deductible tabulation for reporting.

FIG. 1A represents communications between satellites (121) and mobile unit (122). The satellites (121) send out GPS data signals (120). The GPS receiver in the mobile unit (122) receives information such as time, latitude, longitude, speed and heading every second and stores data over specific time intervals such as once every 10 seconds during movement of the mobile unit (121). Data is stored with the storage unit (123) of the mobile unit (122). Data is downloaded to a base computer (124) by a hard wire cable connection (136) or by wireless such as infrared (135) or a wireless radio transceiver (134). The base unit (124) will store the data within local storage (125). Mapping software (126) can access the database to generate various reports (127) or to help the user mark or identify a tax deductible location (128) based either on an actual stop made or a physical location on a map by street address. Once parameters are set, the software will check to see if the mileage is deductible (128). If mileage is not deductible, the software tabulates it as non-tax deductible (131). If the mileage is tax deductible, the software tabulates it as tax deductible (130). The user can review and edit mileage they would like to add or subtract for additional stops to be included or not included in the final report (132). The user cannot change the total mileage for the day as calculated by the GPS route but only the proportion of tax deductible versus non-tax deductible mileage. The user may then generate or view various reports (133) from the database.

Figure 1B:
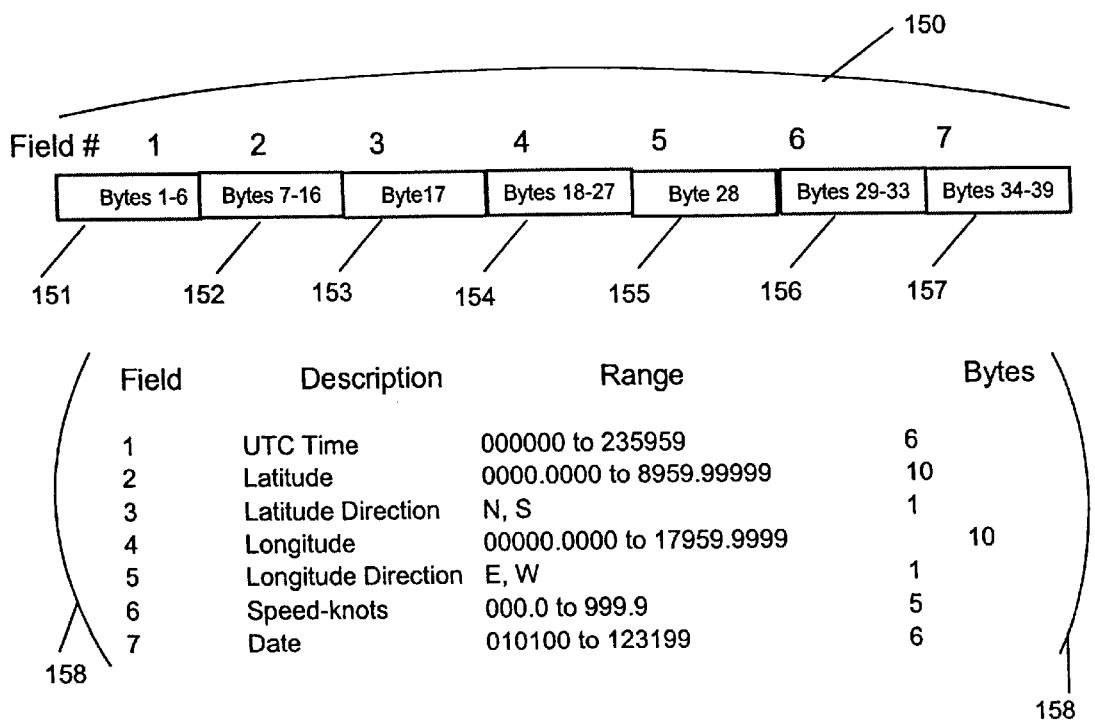
FIG. 1B represents a schematic of a data packet or GPS recorded data frame.

FIG. 1B represents a GPS recorded data frame (150) which is the packet data. The GPS recorded data frame (150) contains 7 fields and 39 consisting of 39 bytes of data. Bytes 1 through 6 (151) are found in field #1 and represent UTC (Universal Time Co-ordinated) and, as can be seen in the field description (158) the range goes from 000000 to 235959. Bytes 7 through 16 (152) are found in field #2 and represent latitude and have a range of 0000.0000 to 8959.9999 as seen in the field description (158). Byte 17 (153) represents latitude direction (North or South) as described in field #3 in the field description (158). Bytes 18 through 27 (154) found in field #4 represent longitude and range from 00000.0000 to 17959.9999 as seen in the field description (158). Byte 28 (155) in field #5 represents the longitude direction (East or West). Bytes 29 through 33 (156) represent the speed in knots as shown in field #6 and have a range of 000.0 to 999.9 as seen in the field description (158). Bytes 34 through 39 (157) represent the date with a range of 010100 through 123199 as seen in field #7 of the field description (158). GPS recorded data frames (or packet data) is collected by the mobile unit(s) over specific time intervals and stored at the mobile units flash memory with the most significant byte'recorded first.

For example, a GPS longitude (154) of 16123.4567 would be recorded and stored in a flash memory address "N" to "N+9" (the 10 bytes of longitude field #4) as:

| Flash Memory Address | Data Byte |
|---|---|
| N | 1 |
| N+1 | 6 |
| N+2 | 1 |
| N+3 | 2 |
| N+4 | 3 |
| N+5 | . |
| N+6 | 4 |
| N+7 | 5 |
| N+8 | 6 |
| N+9 | 7 |

As can be seen in the above example the most significant byte is stored at the first memory address "N".

Figure 2:
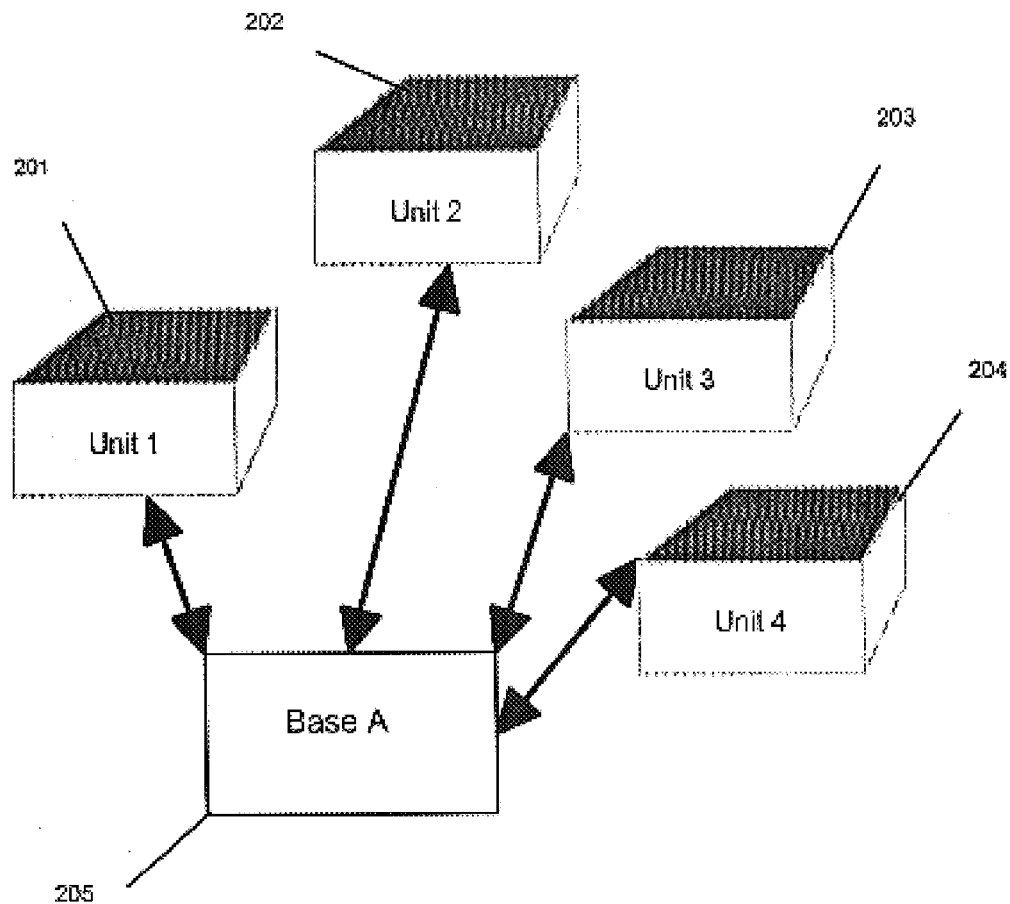
FIG. 2 is a schematic of wireless links between four mobile units and a base unit.

FIG. 2 represents base unit A (block 205) which is set up for four local mobile units (blocks 201, 202, 203, 204). That is, mobile units represented by blocks 201, 202, 203, and 204 belong to base unit A (block 205). If all mobile units remain within a wireless range to base unit A (block 205), then packet data is received by the base unit A (block 205) and stored. Otherwise mobile units must be brought directly to the base unit and data downloaded as described in FIG. 1.

Figure 3A:
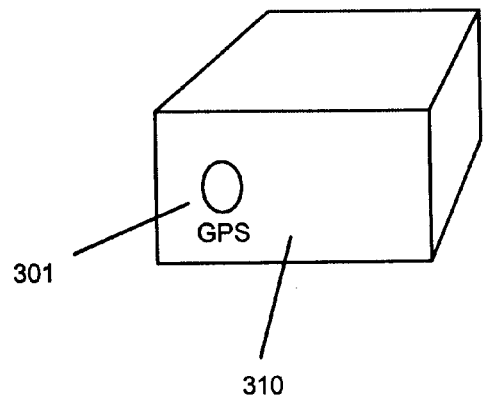
FIG. 3A is a front perspective view of a basic mobile unit.
Figure 3B:
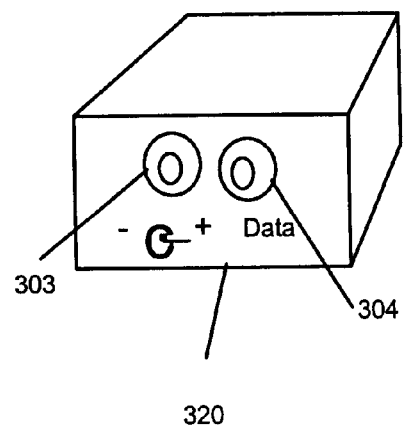
FIG. 3B is a side perspective view of the unit shown in FIG. 3A.
Figure 3C:
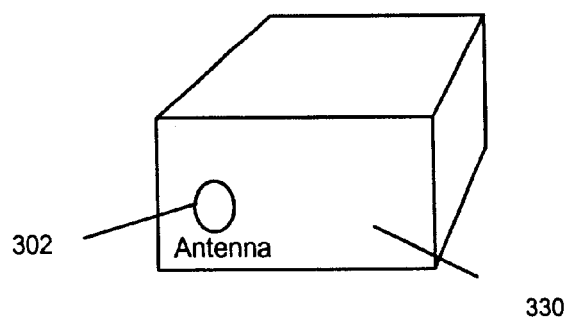
FIG. 3C is a rear perspective view of the unit shown in FIG. 3A.

FIGS. 3A–3C show examples of a configuration of mobile units.

FIG. 3A represents a frontal perspective view of a mobile unit (block 310). An LED (Light Emitting Diode block 301) will be RED if the unit is powered but not receiving GPS signals. The LED (301) will be GREEN when there are adequate GPS signals from the satellites. The LED (301) will blink RED when the mobile unit's data buffer is full.

FIG. 3B represents a side perspective view (block 320) of a basic mobile unit (block 310). It contains a power connection (303) and a data connection (304) to a computer for direct downloading of packet data.

FIG. 3C represents a rear perspective view (block 330) of a mobile unit (block 310). The rear of the mobile unit (block 330) has a GPS antenna connection (block 302).

Figure 4:
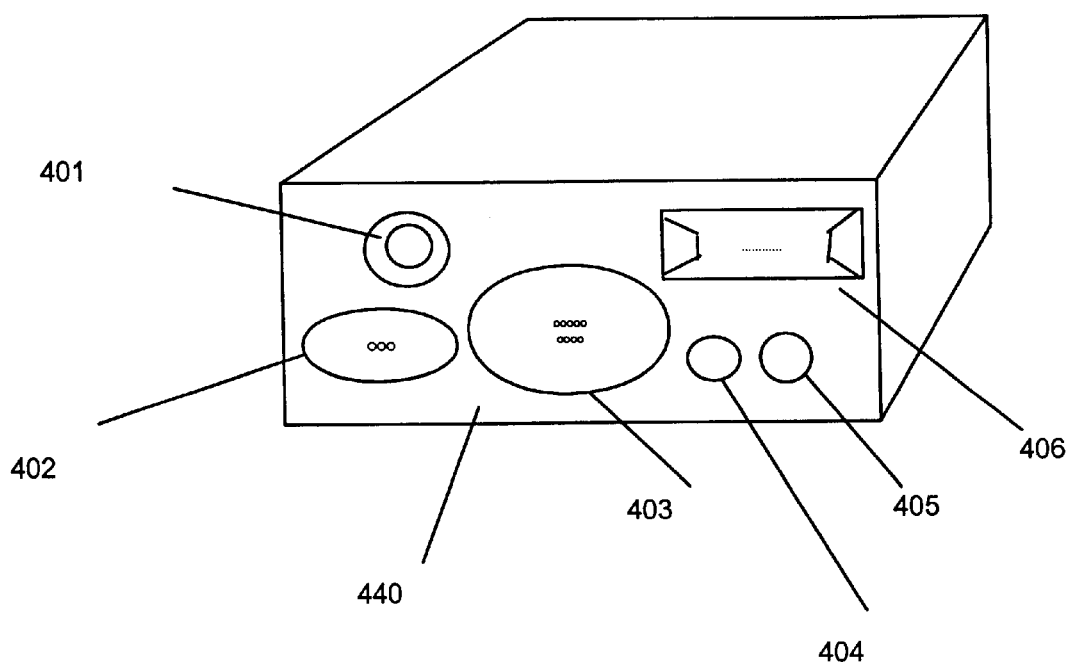
FIG. 4 is a rear perspective view of a high-end or more sophisticated mobile unit shown in FIG. 3A

FIG. 4 (block 440) represents a more sophisticated version of a mobile unit. The mobile unit shown contains a GPS antenna connection (401), a power terminal (402), a Serial PC connection port (403), a radio connection (404), a Differential GPS adapter port (405), and a parallel data collection port (406).

Several of the many types of reports are shown in FIGS. 5, 6C.

FIG. 5 shows an employee Daily Travel Report. The purpose of this report is to show daily in-transit activity for each employee, calculate daily averages and percentages, show tax deductible mileage, non-tax deductible mileage as well as provide a statistical analysis of data accumulated. The example report shown shows employee name (block 501), date (block 502), total Tax Deductible Mileage (block 514) and total Non-Tax Deductible Mileage (block 515). Also shown are many details of the activities of the day. Start times (column block 504), stop times (column block 505), time duration (column block 506), action type (column block 507), vehicle identification (block 516), location name (s) (column block 508), tax deductible locations (column block 511), in transit mileage (column block 509) and tax deductible mileage (column block 510) are among the various details. A total of each individual tax-deductible mileage (column block 510) is added up and the total is shown in tax-deductible mileage as 62.26 miles (block 514). The non-tax deductible mileage total is shown as 2.48 miles (block 515). This report has an area for the employee to input a note as shown in the Memo area (block 512). Block 513 shows comparison and statistical data for administrative use. Such data shows the number of stops, number of routes, total mileage along with time at stops, time in transit, average mileage per route. Statistical data also shows percentage of time spent at stops versus percentage of time spent in transit.

A summary of the report is as follows:

| Leg | Start | Stop | Mileage | User Action | Tax Deductible Mileage |
|---|---|---|---|---|---|
| 1 | Begin | L-Whataburger at 59 | 0.23 | Invalid | 0 |
| 2 | L-Whataburger at 59 | L-Home Office | 13.50 | Valid | 13.50 |
| 3 | L-Home Office | US HWY 90A | 2.81 | Valid | 2.81 |
| 4 | US HWG 90A | Dairy Ashford Rd/ State Spur 41 | 2.25 | Invalid | 0 |
| 5 | Dairy Ashford Rd/ State Spur 41 | L-Restaurant | 17.42 | Valid | 17.42 |
| 6 | L-Restaurant | L-Houston Astrodome | 0.57 | Valid | 0.57 |
| 7 | L-Houston Astrodome | End 22–49 Harbor View Dr. | 26.96 | Valid | 26.96 |

Total Mileage: 64.74
Total Tax Deductible Mileage: 62.26
Total Non-tax Deductible Mileage: 2.48

As can be seen from the above example, there were two invalid legs (1 and 4) and five valid legs (2,3,5,6,7). Legs 1 and 4 can be marked by the end user as invalid by a graphical user interface (GUI) screen which is explained in FIG. 6A below.

Figure 6A:
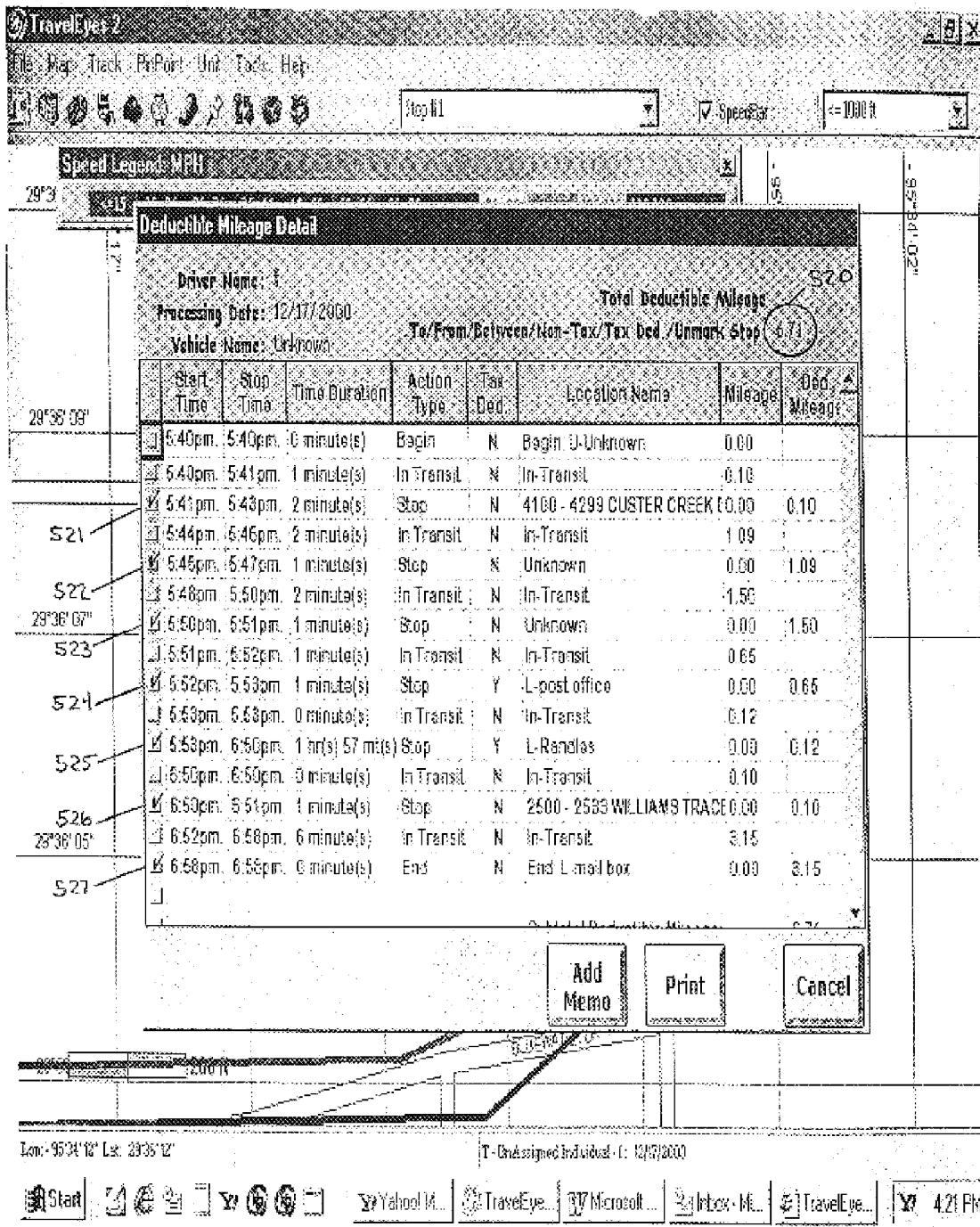
FIGS. 6A, 6B is an example of daily mileage report user screens with FIG. 6A showing total miles and FIG. 6B unmarking locations that are non-tax deductible.

FIG. 6C is a vehicle daily travel report that is similar to FIG. 5, the employee daily travel report. In the following example mileage had been marked by the end user as tax-deductible as shown in FIG. 6A. The end user actions lead to the report of FIG. 6C.

As can be seen in the graphical user interface screen of FIG. 6A, the total marked mileage (520) is 6.71 miles. The end user can review the 7 marked stops (521, 522, 523, 524, 525, 526, 527) along the left edge of the screen. In the example given the end user determines that all marked stops are tax deductible. This can be seen by the check marks left intact by the end user (stops 521 through 527) along the left edge of FIG. 6A. The total tax-deductible mileage is shown on the GUI screen as 6.71 miles (520).

Figure 6B:
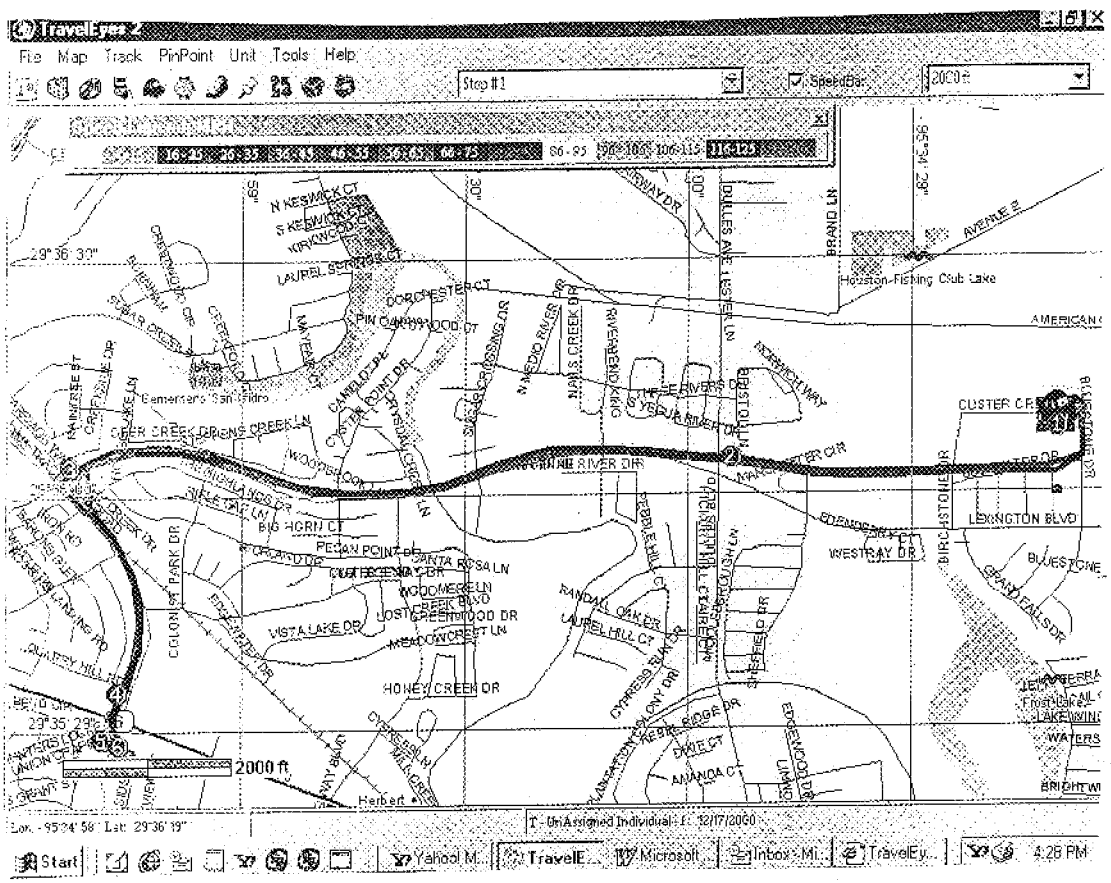

FIG. 6B details the route showing all stops. Stops are labeled 1 through 6 respectively with stop 7 being the return to base.

The resultant generated vehicle daily travel report is shown in FIG. 6C. The vehicle identification is shown on top of the report (601). Driver identification is shown on the top left of the report (602). The total tax deductible mileage is shown on the report as 6.71 miles (603) and the total non-tax deductible mileage is shown as 0.0 miles (604). In this example the end user determined all stops to be valid. The remainder of the report is similar to that described in FIG. 5 above which was described in detail.

The overall purpose of vehicle daily travel report (FIG. 6C) is to show daily in-transit activity for each vehicle, calculate daily averages and percentages as well as provide a statistical analysis of the data overall. Vehicle ID is represented (block 601) along with date (block 605) and drivers name(s) (block 602). Daily totals (block 606) show comparison and statistical data for administrative use. Such data shows the number of stops, number of routes, total mileage along with time at stops, time in transit, total mileage, average mileage per route. Also shown is average time per stop, average time per route, and total accrued time. Statistical data also shows percentage of time spent at stops versus percentage of time spent in transit.

FIG. 7A through FIG. 7F represents a partial daily route showing point-to-point directions.

Figure 7A:
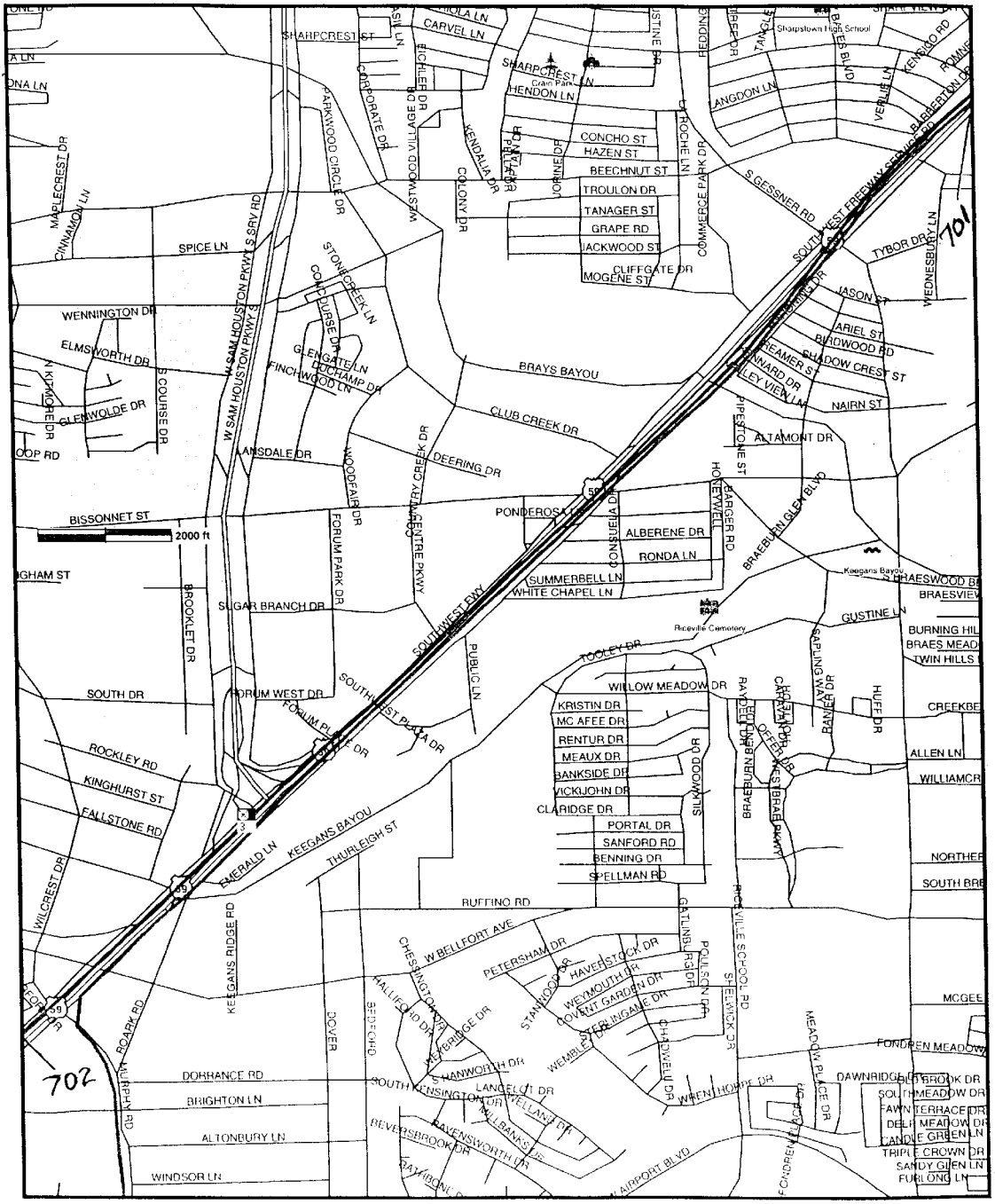
FIGS. 7A, 7B, 7C, 7D, 7E, 7F, is an example of mapping point-to-point directions for a route.

Beginning with FIG. 7A the route proceeds southwesterly from point 701 to point 702 along the SOUTHWEST FWY making a stop at location 3 prior to proceeding again onto SOUTHWEST FWY.

Figure 7B:
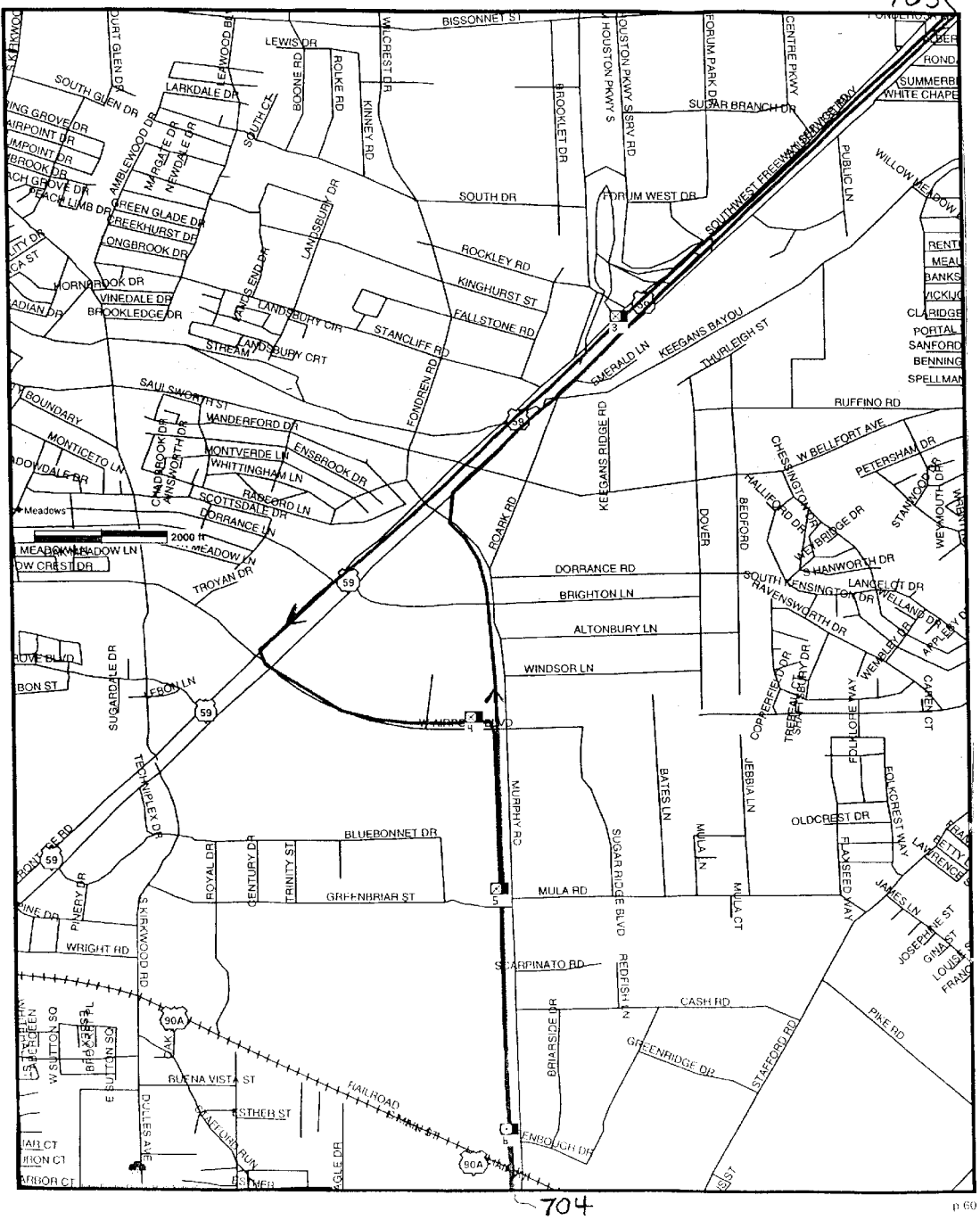

FIG. 7B picks up the route from point 703 to 704 again proceeding southwesterly along SOUTHWEST FWY to W. AIRPORT BLVD to make stop 4, then onto MURPHY RD. to make stops 5 and 6 and continuing South on MURPHY RD. to point 704. FIG. 7B also shows return route going North on MURPHY RD. to pickup Rt. 59 (SOUTHWEST FWY) in a Northeasterly direction.

Figure 7C:
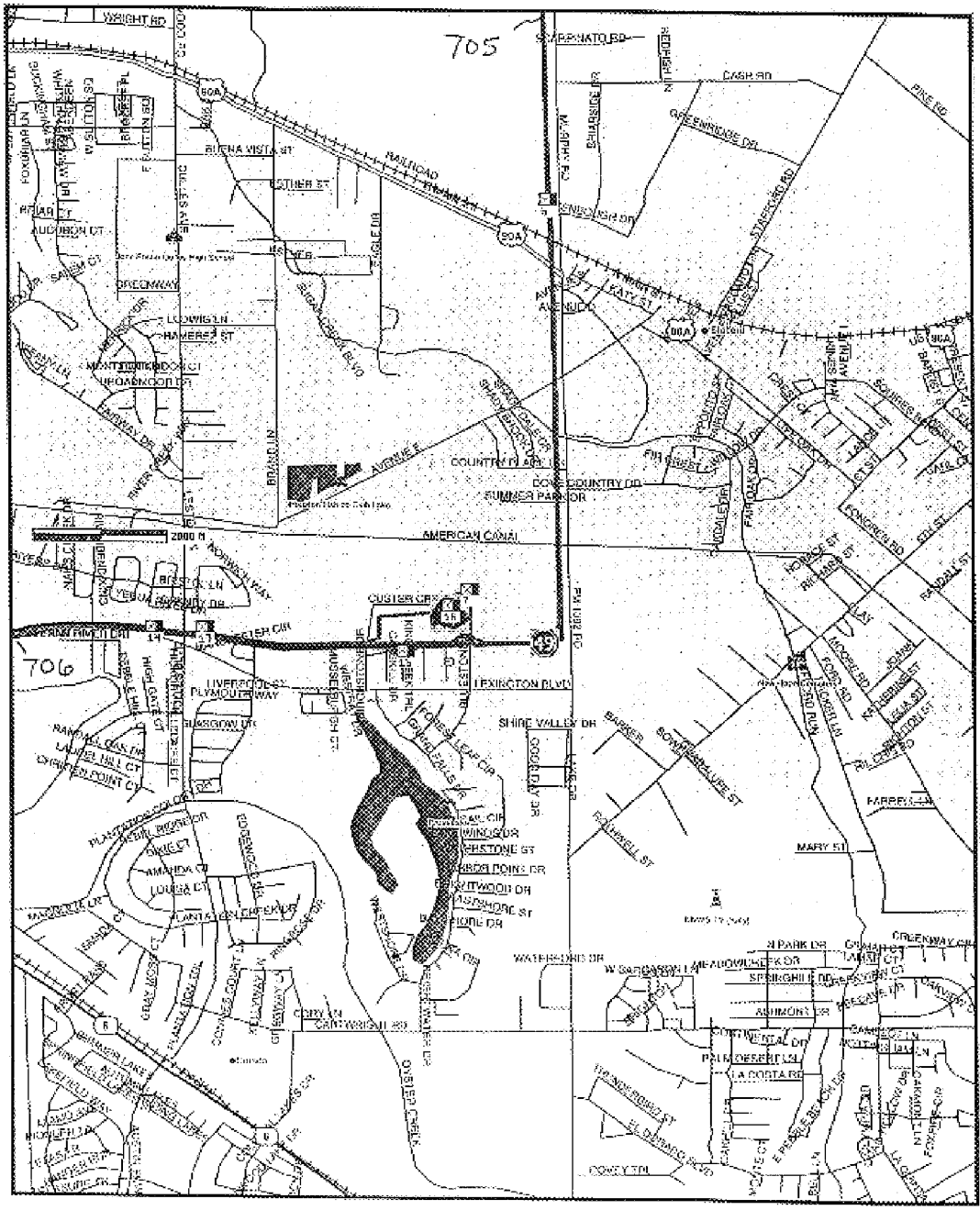

FIG. 7C starts at point 705 and proceeds South along MURPHY RD. (stop 6 is shown again as in FIG. 7B) to West along Rt. 49 showing stops 7, 16, 15, 17, and 14 prior to proceeding again West on Rt. 49 to point 706.

Figure 7D:
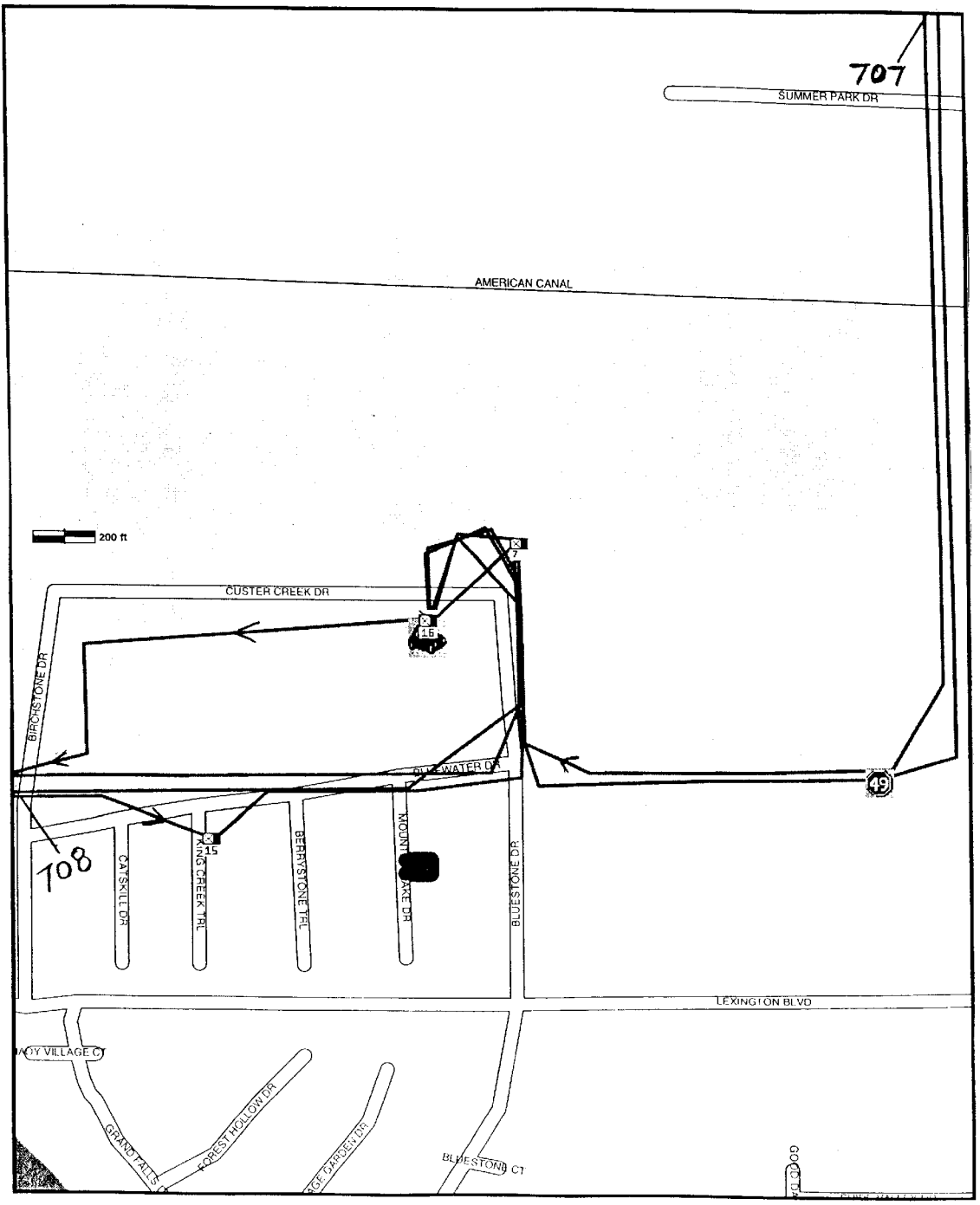

FIG. 7D shows more detail of stops 7, 16 and 15 from point 707 to point 708. FIG. 7D shows turning right onto BLUESTONE DR. to stop 7, stopping for gas at 16, proceeding westerly on CUSTER CREEK DR. to point 708. It also shows the return route going East on Rt. 49 and turning right on KING CREEK RD. to make stop 15 during the return.

Figure 7E:
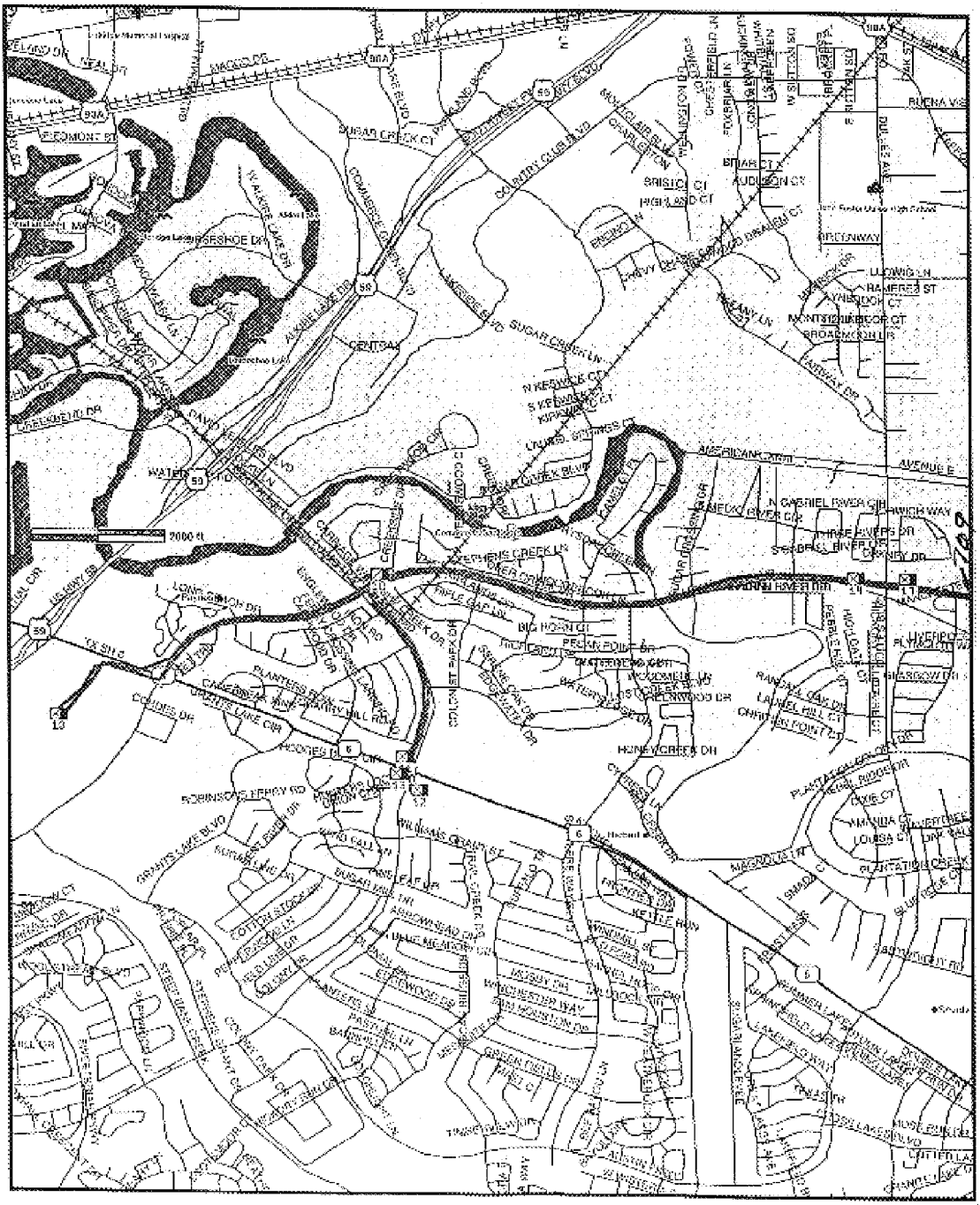

FIG. 7E picks up the travel route again showing stops 14 and 17 as in FIG. 7C. It proceeds West to show stops 10, 18, 11, 13 and 12.

Figure 7F:
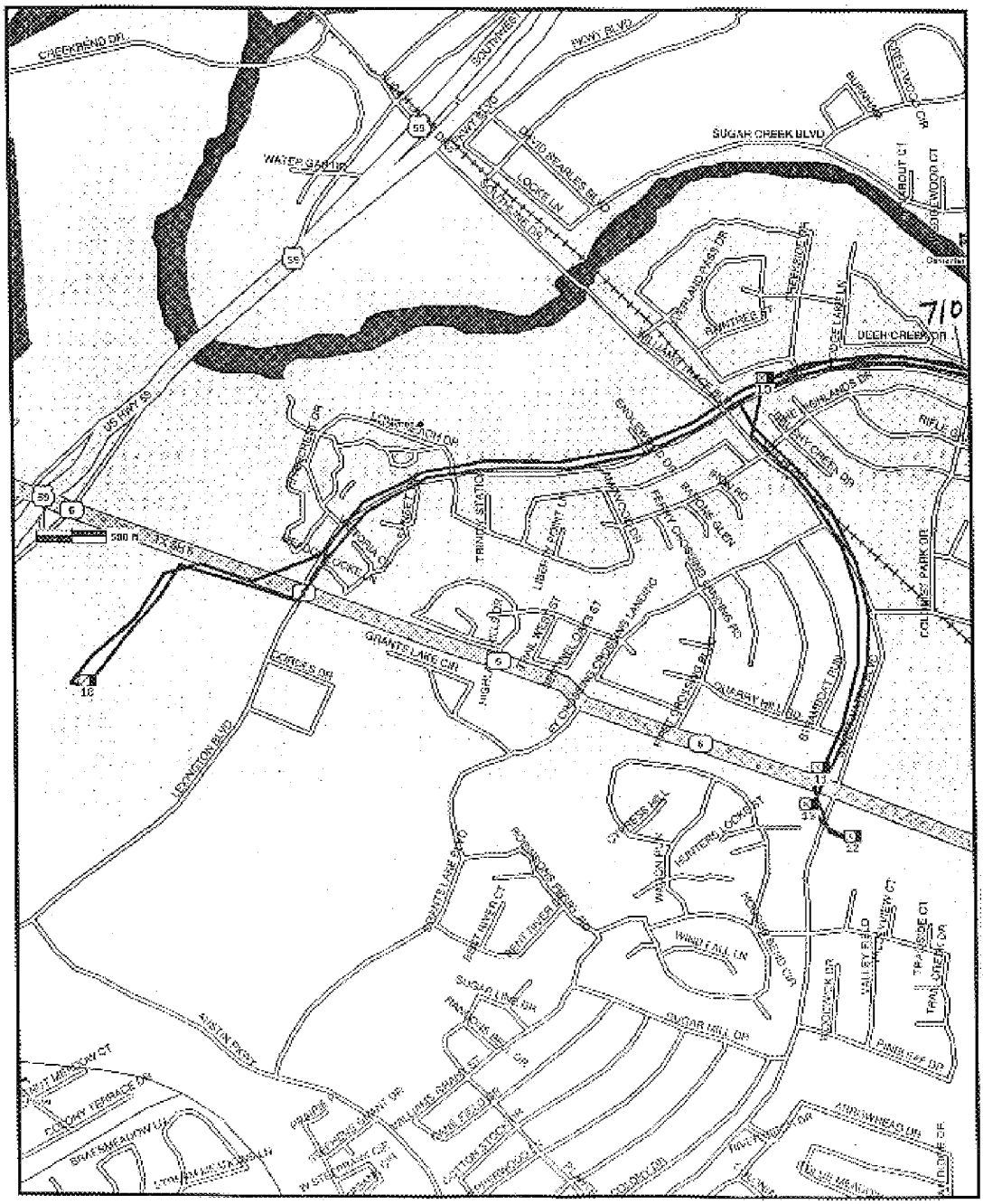

FIG. 7F shows a blow-up detail of stops 10, 18, 11, 13 and 12.

Figure 8:
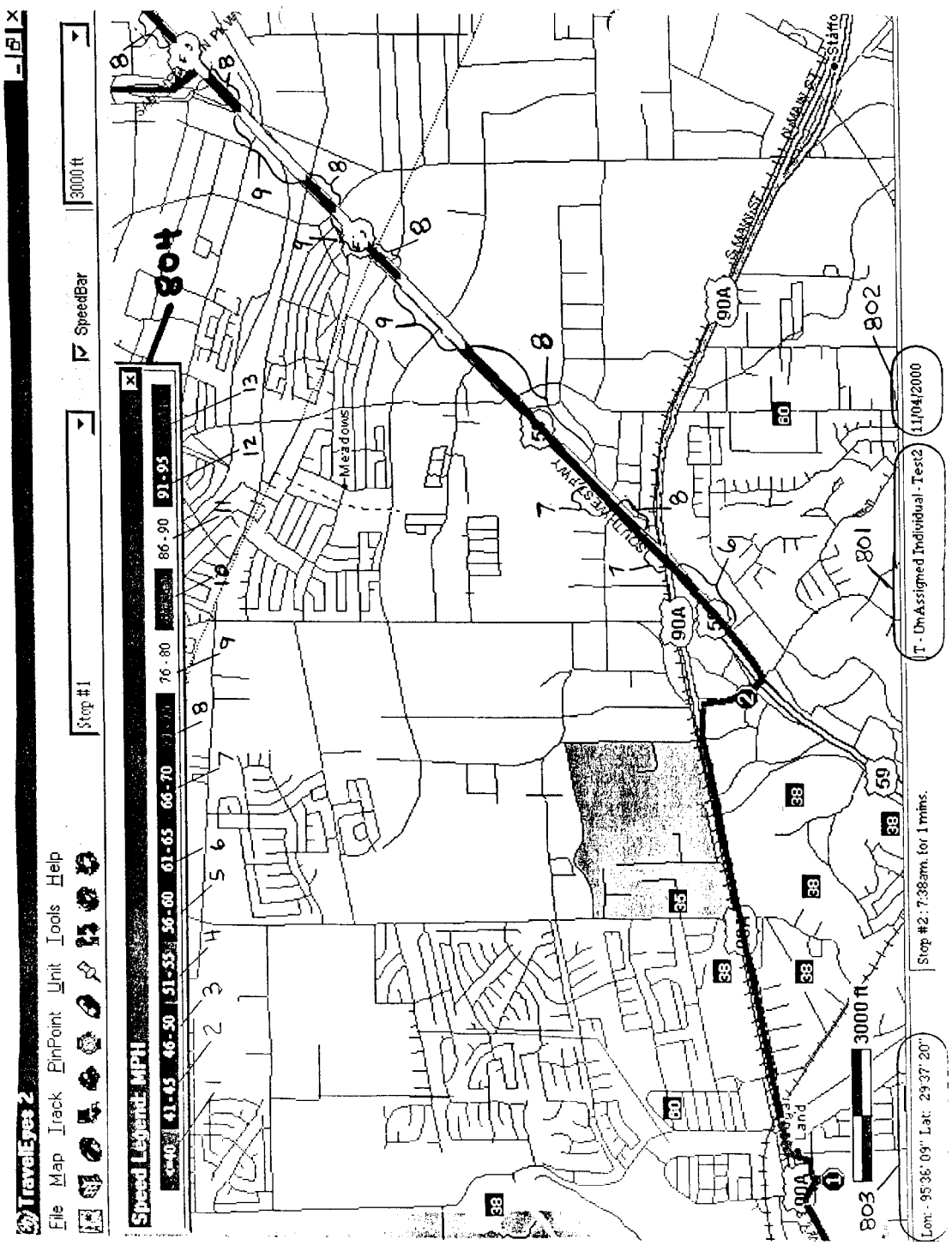
FIG. 8 represents a tracking report of a vehicle route also showing speed indicia.

FIG. 8 shows a vehicle tracking report. Driver name (block 801, date (block 802), longitude/latitude (block 803), route and speed indicia (804) are shown. Speed indicia (rates of speed) are indicated and shown graphically in color. A Speed Legend (block 804) is shown along the top of the report to indicate speed indicia. Speeds are depicted by various colors. For example, Yellow (9) shows a rate of speed range of 76–80 mph while green (10) shows a speed range of 81–85 mph and blue (11) shows a rate of speed of 86–90 mph. In the example shown in FIG. 8 it can be seen that the driver was traveling at various speeds in a Northeast direction along the SOUTHWEST HWY. Following the path Northeast along the intersection of Route 90A and Route 59 it can be see that speeds varied as the driver proceeded Northeast. Starting at the intersection speed started at 66–70 mph (7 representing BROWN) then sped up to 71–75 mph (8 representing RED). The driver then slowed back to 66–70 mph (7 representing BROWN), sped up to 71–75 mph (8 representing RED) then sped up again up to 76–80 mph (9 representing YELLOW) and so forth. If the speed limit on SOUTHWEST HWY were 55 mph or 65 mph perhaps the administrator or manager would take appropriate action against driver.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A method for monitoring a vehicle, wherein the vehicle has an electronic system used to track a location of the vehicle, the method comprising the steps of:
   a.) providing a vehicle location subsystem, said vehicle location subsystem having an on-board vehicle location sensor and data communication module, wherein the module has an on-board unique identifier;
   b.) providing a remote base unit having a data communication module to receive data from the vehicle data communication module, and the remote base unit having a registry of vehicles assigned to itself;
   c.) monitoring and storing a route including stops of the vehicle in the vehicle location subsystem, and downloading the route including stops to said assigned remote base unit;
   d.) comparing said stops to a table of pre-authorized tax-deductible stops;
   e.) reporting a distance traveled between a first and a second pre-authorized stop; and
   f.) presenting a graphical depiction of the route superimposed on a map.

2. The method of claim 1, wherein the step of using a vehicle subsystem further comprises using a mobile GPS sensor.

3. The method of claim 2, wherein the step of using a GPS sensor further comprises using a GPS data storage module to capture GPS data, and transmitting the GPS data to said assigned remote base unit.

4. The method of claim 1, wherein the step of comparing said stops further comprises inputting user data which selects valid versus invalid stops between the first and the second pre-authorized stops for tax purposes.

5. The method of claim 4, wherein the step of inputting user data further comprises a step of selecting valid and invalid legs of the route for tax purposes.

6. The method of claim 1, further comprising a step of selecting valid versus invalid legs of the route for tax purposes, and computing a tax-deductible total distance for the route.

7. The method of claim 1 further comprising the step of inputting and generating inventory data related to the route.

8. The method of claim 7 further comprising the step of generating inventory data comparisons between a first and a second vehicle.

9. The method of claim 1 further comprising the step of reporting data showing a time of stops versus a time of transit.

10. The method of claim 1 further comprising the step of reporting stops designated as customers.

11. The method of claim 1 further comprising the step of collecting an employee identity.

12. The method of claim 1 further comprising the step of collecting a vehicle identity.

13. The method of claim 1 further comprising the step of collecting data from a plurality of vehicles.

14. A method for monitoring a vehicle, wherein the vehicle has an electronic system used to track a location of the vehicle, said method comprising the steps of:
   a.) providing a vehicle location subsystem, said vehicle location subsystem having an on-board vehicle location sensor and data communication module, wherein the module has an on-board unique identifier;

b.) providing a remote base unit having a data communication module to receive data from the vehicle data communication module, and the remote base unit having a registry of vehicles assigned to itself;

c.) monitoring and storing a route of the vehicle in the vehicle location subsystem, and downloading the route of the vehicle to said assigned remote base unit;

d.) selecting a group of legs of the route for computing a total of tax- deductible miles; and e.) presenting a graphical depiction of the route superimposed on a map, thereby facilitating the selecting a group of legs.

15. A method for monitoring a vehicle, wherein the vehicle has an electronic system used to track a location of the vehicle, said method comprising the steps of:

a.) providing a vehicle location subsystem;

b.) monitoring and storing a route of the vehicle;

c.) selecting a group of legs of the route for computing a total of tax deductible miles; and d.) presenting a graphical depiction of the route superimposed on a map, thereby facilitating the selecting a group of legs.

16. A method for monitoring a vehicle, wherein the vehicle has an electronic system used to track a location of the vehicle, said method comprising the steps of:

a.) providing a vehicle location subsystem, said vehicle location subsystem having an on-board vehicle location sensor and data communication module, wherein the module has an on-board unique identifier;

b.) providing a remote base unit having a data communication module to receive data from the vehicle data communication module, and the remote base unit having a registry of vehicles assigned to itself;

c.) monitoring and storing a route in incremental time segments in the vehicle location subsystem, whereby said incremental time segments can be verified with times established for pre-authorized tax-deductible stops, and downloading the route in incremental time segments to said assigned remote base unit;

d.) calculating a vehicle speed for each time segment;

e.) coding a range of speeds; and f.) displaying a graphic depiction of a speed history using the coding.

17. The method of claim 16 further comprising the step of using colors as the coding and displaying a colored route history where changing colors represents changing speeds.

18. The method of claim 16 further comprising the step of assigning an incremental time segment of less than fifteen seconds.

19. The method of claim 18 further comprising the step of calculating and displaying a continuous line representation, not a dotted representation, of the route.

20. A method for monitoring a vehicle, wherein the vehicle has an electronic system used to track a location of the vehicle, said method comprising the steps of:

a.) providing a vehicle location subsystem, said vehicle location subsystem having an on-board vehicle location sensor and data communication module, wherein the module has an on-board unique identifier;

b.) providing a remote base unit having a data communication module to receive data from the vehicle data communication module, and the remote base unit having a registry of vehicles assigned to itself;

c.) monitoring and storing a route of the vehicle in the vehicle location subsystem, and downloading the route of the vehicle to said assigned remote base unit; and d.) using a time originating from the vehicle location subsystem to record employee time worked data, thereby facilitating a calculation of tax-deductible mileage.

21. The method of claim 20 further comprising the step of using a GPS system for the vehicle location subsystem, and using user inputted data to further record employee time worked.

22. The method of claim 21 further comprising the step of using a data entry device associated with the GPS system for capturing the user inputted data.

23. A system for monitoring data for a mobile vehicle, the system comprising:

a.) means for providing an on-board mobile vehicle location sensor and data communication module functioning to transmit or receive data, wherein the module has an on-board unique identifier;

b.) means for providing a remote base unit having a data communication module functioning to receive data from the mobile vehicle data communication module, and the remote base unit having a registry of mobile vehicles assigned to itself;

c.) means for monitoring and storing a route including stops of the vehicle functioning to manage route information in the vehicle location subsystem, and downloading the route including stops to the assigned remote base unit;

d.) means for comparing said stops to a table of pre-authorized tax-deductible stops functioning to provide a user with tax-deductible mileage information;

e.) means for reporting a distance traveled between a first and a second pre-authorized stop functioning to provide a user with tax-deductible mileage records; and f.) means for presenting a graphical depiction of the route superimposed on a map.

* * * * *